(12) United States Patent
Liu et al.

(10) Patent No.: US 12,467,372 B2
(45) Date of Patent: Nov. 11, 2025

(54) TURBINE AIRFOIL COATING

(71) Applicant: RTX Corporation, Farmington, CT (US)

(72) Inventors: Xuan Liu, Glastonbury, CT (US); Danielle E. Jencks, Glastonbury, CT (US); Glenn A. Cotnoir, Thompson, CT (US); Brian T. Hazel, Avon, CT (US); Lucy Jean Raymond, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/985,995

(22) Filed: Dec. 18, 2024

(65) Prior Publication Data

US 2025/0250905 A1 Aug. 7, 2025

Related U.S. Application Data

(63) Continuation-in-part of application No. 18/742,488, filed on Jun. 13, 2024, now abandoned.

(Continued)

(51) Int. Cl.
*F01D 5/28* (2006.01)
*C22C 19/05* (2006.01)
(Continued)

(52) U.S. Cl.
CPC ............ *F01D 5/288* (2013.01); *C22C 19/058* (2013.01); *C22C 30/00* (2013.01); *C23C 10/08* (2013.01);
(Continued)

(58) Field of Classification Search
CPC . F01D 5/288; F05D 2300/611; C22C 19/058; C23C 4/134; C23C 4/18;
(Continued)

(56) References Cited

U.S. PATENT DOCUMENTS 4,419,416 A 12/1983 Gupta et al.
4,617,202 A * 10/1986 Baldi ...................... C23C 10/60
427/253

(Continued)

FOREIGN PATENT DOCUMENTS

EP 2876185 A1 5/2015
GB 2401117 A 11/2004

OTHER PUBLICATIONS

European Search Report dated Jun. 2, 2025 for European Patent Application No. 24221147.2.

(Continued)

*Primary Examiner* — Eldon T Brockman
(74) *Attorney, Agent, or Firm* — Bachman & LaPointe, P.C.

(57) ABSTRACT

A method for coating a metallic substrate includes applying an MCrAlY coating. Machining removes the MCrAlY coating from one or more regions of the substrate. A simultaneous aluminizing and chromizing: aluminizes an interior surface region of the substrate lacking the MCrAlY and at least a portion of a region where the MCrAlY remains; and chromizes an exterior surface region of the substrate lacking the MCrAlY and at least a different portion of the region where the first MCrAlY remains.

20 Claims, 6 Drawing Sheets

Related U.S. Application Data (60) Provisional application No. 63/472,801, filed on Jun. 13, 2023.

(51) Int. Cl.
  *C22C 30/00* (2006.01)
  *C23C 10/08* (2006.01)
  *C23C 10/56* (2006.01)
  *C23C 28/02* (2006.01)

(52) U.S. Cl.
  CPC .......... *C23C 10/56* (2013.01); *C23C 28/022* (2013.01); *F05D 2230/90* (2013.01); *F05D 2300/611* (2013.01)

(58) Field of Classification Search
  CPC ....... C23C 10/04; C23C 10/48; C23C 28/022; C23C 10/56
  See application file for complete search history.

(56) References Cited

U.S. PATENT DOCUMENTS

| | | | |
|---|---|---|---|
| 4,861,618 A | 8/1989 | Vine et al. | |
| 4,897,315 A | 1/1990 | Gupta | |
| 5,514,482 A | 5/1996 | Strangman | |
| 5,989,733 A | 11/1999 | Warnes et al. | |
| 6,080,246 A | 6/2000 | Wing | |
| 6,435,830 B1 | 8/2002 | Allen et al. | |
| 7,413,778 B2 | 8/2008 | Gorman et al. | |
| 7,476,450 B2 | 1/2009 | Maloney et al. | |
| 7,749,569 B2 | 7/2010 | Wilkins et al. | |
| 7,824,738 B2 | 11/2010 | Smith et al. | |
| 8,277,195 B2 | 10/2012 | Box et al. | |
| 8,425,979 B2 | 4/2013 | Trzcinski et al. | |
| 8,641,963 B2 | 2/2014 | Tryon et al. | |
| 8,839,739 B2 | 9/2014 | Soucy et al. | |
| 9,382,605 B2 | 7/2016 | Tryon et al. | |
| 9,587,302 B2 | 3/2017 | Tang et al. | |
| 10,113,225 B2 * | 10/2018 | Murphy | C23C 10/32 |
| 10,407,762 B2 | 9/2019 | Tang et al. | |
| 10,914,181 B2 | 2/2021 | Stanka et al. | |
| 11,719,105 B2 * | 8/2023 | Task | C23C 16/06 427/237 |
| 2008/0057189 A1 | 3/2008 | Smith et al. | |
| 2008/0182026 A1 | 7/2008 | Hu et al. | |
| 2010/0154425 A1 | 6/2010 | Litton et al. | |
| 2015/0197841 A1 | 7/2015 | Tang et al. | |
| 2017/0058390 A1 | 3/2017 | Tang et al. | |
| 2018/0282854 A1 | 10/2018 | Task et al. | |
| 2019/0284941 A1 | 9/2019 | Task et al. | |
| 2021/0054744 A1 | 2/2021 | Task | |
| 2024/0344192 A1 * | 10/2024 | Freedman | C23C 4/073 |

OTHER PUBLICATIONS

Stanley R. Levine, "High Temperature Surface Protection", NASA Technical Memorandum 73877, Jan. 1, 1978, NASA Lewis Research Center, Cleveland, Ohio.

European Search Report dated Oct. 1, 2024 for European Patent Application No. 24181493.8.

Notice of Allowance dated Sep. 29, 2024 for U.S. Appl. No. 18/742,488.

* cited by examiner

FIG. 3
(Gaspath)

| |
|---|
| 208 Ceramic Barrier |
| 206 Al$_2$O$_3$ TGO |
| 204 Aluminized/Diffused Ni-Co-Cr-Al-Hf-Si-Y-Zr |
| 202 Interdiffusion/Gradient Zone |
| 200 Ni-Co-Cr-Al-Hf-Si-Y-Zr |
| 22 Nickel Alloy Substrate |

(Layers 200–208 bracketed as 24)

FIG. 4
(Interior)

| |
|---|
| 226 Al$_2$O$_3$ TGO |
| 224 Ni-Co-Cr-Al |
| 220 Interdiffusion/Gradient Zone |
| 22 Nickel Alloy Substrate |

(Layers 220–226 bracketed as 26)

FIG. 5
(Root)

| |
|---|
| 232 Cr$_2$O$_3$ TGO |
| 230 Ni-Co-Cr |
| 22 Nickel Alloy Substrate |

(Layers 230–232 bracketed as 28)

FIG. 6
(Platform Underside)

| |
|---|
| 246 Cr$_2$O$_3$ TGO |
| 244 Ni-Co-Cr-Hf-Si-Y-Zr + Alpha-Cr |
| 242 Interdiffusion/Gradient Zone |
| 240 Ni-Co-Cr-Al-Hf-Si-Y-Zr |
| 22 Nickel Alloy Substrate |

(Layers 240–246 bracketed as 30)

FIG. 7
(Tip)

| | |
|---|---|
| | 260 Abrasive/Matrix |
| | 206 Al$_2$O$_3$ TGO |
| 32 | 204 Aluminized/Diffused Ni-Co-Cr-Al-Hf-Si-Y-Zr |
| | 202 Interdiffusion/Gradient Zone |
| | 200 Ni-Co-Cr-Al-Hf-Si-Y-Zr |
| | 22 Nickel Alloy Substrate |

TURBINE AIRFOIL COATING

CROSS-REFERENCE TO RELATED APPLICATION

This is a continuation-in-part of U.S. patent application Ser. No. 18/742,488, filed Jun. 13, 2024, and entitled "Turbine Airfoil Coating", which claims benefit of U.S. Patent Application No. 63/472,801, filed Jun. 13, 2023, and entitled "Turbine Airfoil Coating", the disclosure of which is incorporated by reference herein in its entirety as if set forth at length.

BACKGROUND

The disclosure relates to gas turbine engines. More particularly, the disclosure relates to coatings for metallic substrates.

Gas turbine engines (used in propulsion and power applications and broadly inclusive of turbojets, turboprops, turbofans, turboshafts, industrial gas turbines, and the like) include metallic components (e.g., with nickel-based superalloy substrates) having ceramic barrier and other coatings (e.g., environmental barrier coatings (EBC), thermal barrier coatings (TBC), abradable coatings, and the like) and corrosion coatings. The ceramic coatings are typically along gas-path-facing surfaces. Corrosion coatings are typically on other surfaces such as internal cooling passageway surfaces, blade and vane platform underside surfaces, vane shroud outer diameter (OD) surfaces, and the like.

Turbine blades require protection on the airfoil gaspath surface, the tip and under platform regions for differing failure modes. They also require a thermal barrier coating (TBC) to be deposited on the airfoil surface to give it thermal protection with exceptional spall life. Currently, multiple steps are required to coat each of these areas with different coatings for adequate protection. An example may require a platinum plating step (overall exterior), an aluminizing step (overall interior and exterior), heat treatment (forms the aluminide from the prior steps), application of overlay coatings (under platform such as high-Cr MCrAlY by cathodic arc or LPPS), heat treatment, then chromizing (e.g., slurry chromizing under platform particularly NLOS regions missed by the high-Cr MCrAlY) and heat treatment step, finally a TBC application (ceramic principally to gaspath surfaces such as EB-PVD). This can make manufacturing complex, challenging, difficult to mask (certain regions) and expensive.

U.S. Pat. No. 6,435,830, Allen et al., Aug. 20, 2002, "Article having corrosion resistant coating", (the '830 patent), the disclosure of which is incorporated by reference in its entirety herein as if set forth at length, discloses a high-Cr MCrAlY along the under-platform surfaces of a blade.

Alternatively to aluminide, a high-Al MCrAlY may be used as a bondcoat for a ceramic barrier coat on the gaspath surfaces. An example is shown in U.S. Pat. No. 4,419,416A, Gupta et al., Dec. 6, 1983, "Overlay coatings for superalloys", (the '416 patent).

During aluminization of the internal cooling passageways, it is known to mask exterior portions of the substrate against contamination from the aluminization vapors. This can limit degradation of finished surfaces (e.g., pre-machined root surfaces or surfaces that are to receive subsequent bondcoat application (e.g., along the gaspath-facing surfaces)).

U.S. Pat. No. 8,839,739B2, "MASKING APPARATUS", Soucy et al., Sep. 23, 2014 (the '739 patent), the disclosure of which is incorporated by reference in its entirety herein as if set forth at length, discloses a two-piece masking apparatus that encloses the entire blade.

U.S. Pat. No. 10,407,762B2, Tang et al., Sep. 10, 2019, "Mask formulation to prevent aluminizing onto the pre-existing chromide coating" (the '762 patent), the disclosure of which is incorporated by reference in its entirety herein as if set forth at length, discloses a mask for preventing chromium depletion while preventing an aluminide coating to be deposited on the masked area.

U.S. Pat. No. 5,514,482, Strangman, May 7, 1996, "Thermal Barrier Coating System for Superalloy Components", discloses aluminide or modified aluminide with the addition of a ceramic coating (thermal barrier coating (TBC)) applied on top with a method such as EB-PVD.

SUMMARY

One aspect of the disclosure involves a method for coating a metallic substrate. The method comprises: applying a first MCrAlY coating; and machining to remove said first MCrAlY coating from one or more regions of the substrate. A mask having at least a chromium-containing chromizing portion is applied to a combination of: regions of the substrate from which the first MCrAlY has been removed; and regions of the substrate on which the first MCrAlY remains but not on other regions of the substrate on which the first MCrAlY remains. The method includes aluminizing: an interior surface region of the substrate; and at least a portion of the region where the first MCrAlY remains absent the mask, wherein, during the aluminizing, the mask masks from the aluminzing but chromizes the regions to which the chromizing portion was applied. The mask is removed.

In a further embodiment of any of the foregoing embodiments, additionally and/or alternatively, the mask is preformed and is applied as at least two (e.g., a pair of) pieces.

In a further embodiment of any of the foregoing embodiments, additionally and/or alternatively, the mask comprises: a sintered substrate; and a chromium halide coating forming the chromizing portion on the sintered substrate.

In a further embodiment of any of the foregoing embodiments, additionally and/or alternatively, the sintered substrate comprises alumina plus Ni, Cr and additional Al.

In a further embodiment of any of the foregoing embodiments, additionally and/or alternatively, the sintered substrate comprises NiAl, NiCr and alumina.

In a further embodiment of any of the foregoing embodiments, additionally and/or alternatively, the sintered substrate comprises NiAlCr intermetallic and alumina.

In a further embodiment of any of the foregoing embodiments, additionally and/or alternatively, the aluminizing comprises exposing to an aluminum halide activator.

In a further embodiment of any of the foregoing embodiments, additionally and/or alternatively, the first MCrAlY is a NiCoCrAlY.

In a further embodiment of any of the foregoing embodiments, additionally and/or alternatively, the first MCrAlY is a NiCoCrAlY having Hf, Si, and Zr (is a NiCoCrAlHfYSiZr).

In a further embodiment of any of the foregoing embodiments, additionally and/or alternatively, the first NiCoCrAlY has: 0.01% to 5.0% Si; 0.01% to 2.0% Hf; and 0.01% to 0.10% Zr.

In a further embodiment of any of the foregoing embodiments, additionally and/or alternatively, the first MCrAlY comprises 25% to 40% by weight Cr.

In a further embodiment of any of the foregoing embodiments, additionally and/or alternatively, the first MCrAlY comprises 5% to 15% by weight Al.

In a further embodiment of any of the foregoing embodiments, additionally and/or alternatively, the first MCrAlY comprises by weight: 25% to 40% Cr; 5% to 15% by weight Al; 0.01% to 2.0% Y; up to 30% Co; 0.01% to 5.0% Si; 0.01% to 2.0% Hf; 0.01% to 0.10% Zr; and balance Ni plus impurities.

In a further embodiment of any of the foregoing embodiments, additionally and/or alternatively, the Co content is 5.0% to 25.0% by weight.

In a further embodiment of any of the foregoing embodiments, additionally and/or alternatively, the substrate is a blade precursor substrate having: a root section; an airfoil section; and a platform section between the root section and the airfoil section. Optionally, the mask is applied to the root.

In a further embodiment of any of the foregoing embodiments, additionally and/or alternatively: the regions of the substrate from which the first MCrAlY has been removed by the machining but to which the chromizing portion was applied comprise surfaces of the root section; the regions of the substrate on which the first MCrAlY has not been removed by the machining but to which the chromizing portion was applied comprise an underside of the platform section; and the other regions of the substrate on which the first MCrAlY has not been removed by the machining comprise a majority of a lateral surface of the airfoil section and an outer diameter surface of the platform section.

In a further embodiment of any of the foregoing embodiments, additionally and/or alternatively, one of: a tip of the airfoil is a region of the substrate from which the first MCrAlY has been removed by the machining but to which the mask was not applied; and said other regions of the substrate on which the first MCrAlY has not been removed by the machining but to which the chromizing portion was not applied comprise a tip of the airfoil section.

In a further embodiment of any of the foregoing embodiments, additionally and/or alternatively, a region of the substrate from which the first MCrAlY has been removed but to which a portion of the mask other than the chromizing portion was applied comprises an inner diameter face of the root.

In a further embodiment of any of the foregoing embodiments, additionally and/or alternatively, the method further comprises applying a ceramic coating along at least some of said other regions of the substrate on which the first MCrAlY remains.

Another aspect of the disclosure involves a blade having a metallic substrate with internal passageways and having: an attachment root having one or more inlets to the passageways; an airfoil through which the passageways pass; a platform between the root and the airfoil and having an underside surface adjacent the root and a gaspath surface adjacent the airfoil. A first coating along a majority of the airfoil comprises: one or more NiCoCrAlY layers progressively outwardly increasing in aluminum content; and one or more ceramic layers. A second coating along the internal passageways comprises an aluminization. A third coating along the root comprises a NiCoCr chromization. A fourth coating along the underside of the platform comprises: a NiCoCrAlY layer; and a NiCoCrAlY plus alpha-Cr layer.

In a further embodiment of any of the foregoing embodiments, additionally and/or alternatively, the blade further comprises a fifth coating at a tip of the airfoil comprising a NiCoCrAlY layer and an abrasive layer.

In a further embodiment of any of the foregoing embodiments, additionally and/or alternatively: the first coating further comprises an alumina TGO; the second coating further comprises an alumina TGO; the third coating further comprises a chromia TGO; and the fourth coating further comprises a chromia TGO.

In a further embodiment of any of the foregoing embodiments, additionally and/or alternatively, the first coating progressive aluminum increase is at least a difference of 5.0 weight percent; and the fourth coating NiCoCrAlY plus alpha-Cr layer has at least 70% Cr by weight.

In a further embodiment of any of the foregoing embodiments, additionally and/or alternatively, the blade has a Ni-alloy substrate; and/or the root is a firtree root.

A further aspect of the disclosure involves, a method for coating a metallic substrate including applying an MCrAlY coating. Machining removes the MCrAlY coating from one or more regions of the substrate. A simultaneous aluminizing and chromizing: aluminizes an interior surface region of the substrate lacking the MCrAlY and at least a portion of a region where the MCrAlY remains; and chromizes an exterior surface region of the substrate lacking the MCrAlY and at least a different portion of the region where the first MCrAlY remains.

In a further embodiment of any of the foregoing embodiments, additionally and/or alternatively, said exterior surface region of the substrate lacking the MCrAlY includes at least a portion of the one or more regions of the substrate from which the MCrAlY was removed. Optionally, all said MCrAlY may be applied from a common source in a single step. Optionally, the metallic substrate is a blade substrate and: the removal of MCrAlY is from a root; the aluminizing where MCrAlY remained is an airfoil exterior surface and platform outer diameter surface; the chromizing the exterior surface region of the substrate lacking the first MCrAlY is at a portion of the root; and the chromizing the different portion of the region where the first MCrAlY remains is at a platform underside.

The details of one or more embodiments are set forth in the accompanying drawings and the description below. Other features, objects, and advantages will be apparent from the description and drawings, and from the claims.

DETAILED DESCRIPTION

An example metallic substrate to be coated is a cast substrate. An example cast substrate is a blade substrate precursor (lacking final machining steps). As an example blade, the substrate may be a cast Ni-base superalloy substrate (e.g., single-crystal, (SX)). An example blade substrate precursor is for an internally-cooled blade wherein the precursor is cast (e.g., investment cast) with at least feed passageways (e.g., cast via ceramic feedcore) and optionally some to all of its outlet passageways. For example, a trailing edge discharge slot may be cast such as via the feedcore or a refractory metal core (RMC) assembled thereto; whereas, leading edge and other film cooling holes along the lateral surface of the airfoil may subsequently be drilled or otherwise machined (e.g., electrodischarge machining (EDM) discussed further below).

As is discussed below, the ultimate article (e.g., blade in the example) has coated internal cooling passageways plus a combination of differently-coated exterior areas/regions.

In at least one region of the ultimate article, the coating includes a bondcoat and a ceramic coating (e.g., in one or more layers, a thermal barrier coating (TBC), an environmental barrier coating (EBC), and/or an abradable coating). In at least one other region, there may be other layering absent the ceramic. Discussed below, the same material and process step used to apply the bondcoat or precursor thereof may apply such material to one or more other regions that ultimately lack the ceramic. This may economize on the required steps to provide diverse coating compositions on diverse regions for diverse purposes.

Bondcoat source material may be a conventional MCrAlY. Specific examples a are high-chromium MCrAlY. An example high-Cr MCrAlY may have by weight Al of 5.0% to 15.0% (more narrowly 6.0% to 12.0%) and Cr of 15.0% to 50.0% (more narrowly 25.0% to 40.0%) and/or an Al:Cr weight ratio of 1:3 (more broadly 1:1.5 to 1:10 or 1:2 to 1:6 or 1:3 to 1:5).

In some locations, the process may modify the composition relative to source MCrAlY or as-deposited MCrAlY to have at least a layer (depthwise region) having an aluminum-enriched composition such as that of conventional high-aluminum MCrAlY. An example high-Al MCrAlY may have by weight Al of 5.0% to 15.0% (more narrowly 10.0% to 13.0%) and Cr of 5.0% to 25.0% (more narrowly 15.0% to 23.0%) and/or an Al:Cr weight ratio of 1:1.5 (more broadly 1:1.3 to 2:1 or 1:1.1 to 3:1).

However, yet greater Cr and/or Al enrichments are possible over the as-applied MCrAlY. Also, the process may allow use of MCrAlY source material other than might otherwise be used in industry.

Figure 1:
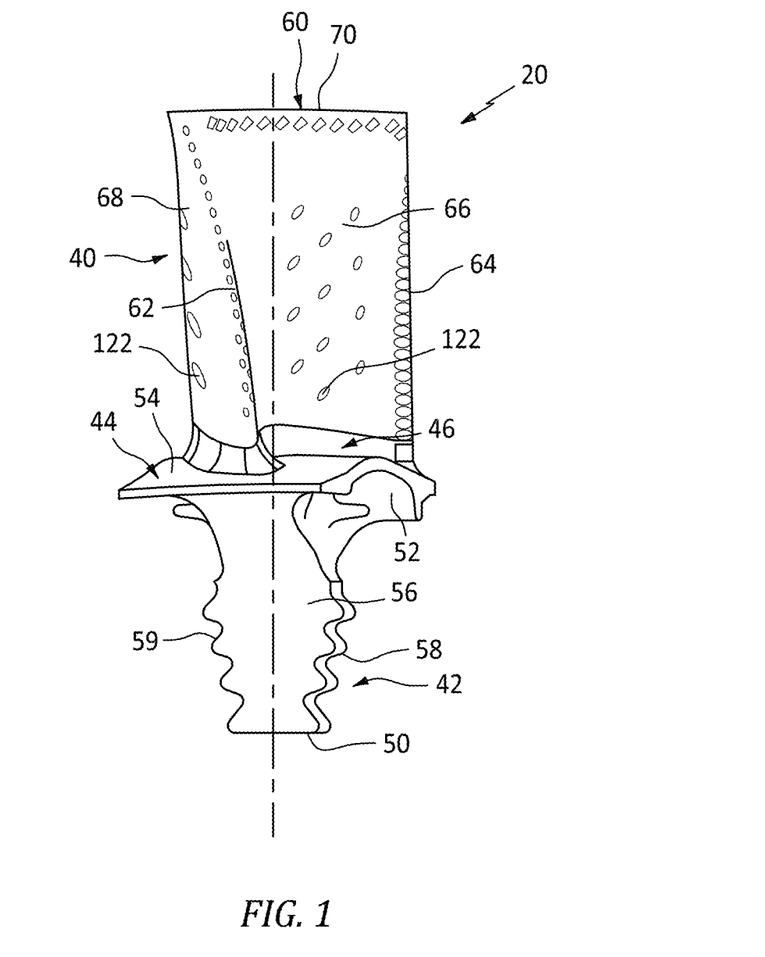
FIG. 1 is a view of a gas turbine engine blade.
Figure 2:
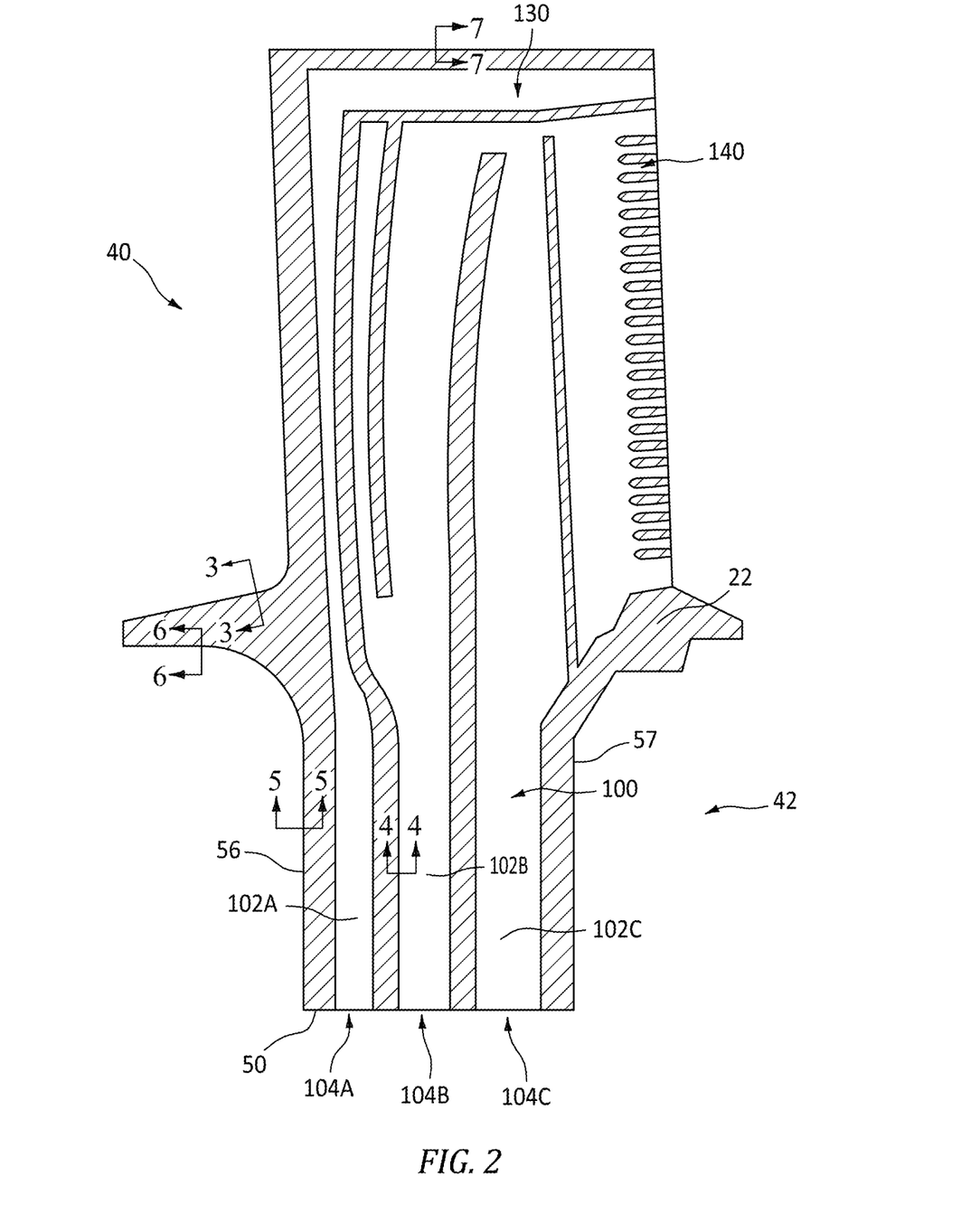
FIG. 2 is a schematic chordwise cross-sectional view of the blade.

FIG. 1 shows an example article 20 as a blade. The blade comprises a metallic substrate 22 (FIG. 2). An example substrate comprises a unitary metallic casting (e.g., a single-crystal (SX) casting of a nickel-based superalloy) and defines the overall gross features of the blade. The substrate and blade thus include an airfoil 40 and an attachment feature 42 (e.g., a firtree root). The blade and substrate may further include a platform 44 between the airfoil and the firtree root.

The firtree root 42 extends from an inboard end (inner diameter (ID) face) 50 forming an inboard end of the blade to an outboard end at an underside 52 of the platform. The airfoil 40 extends from an inboard end at a fillet 46 joining an outer surface (gaspath-facing surface) 54 of the platform to a tip 60. The airfoil extends from a leading edge 62 to a trailing edge 64 and has a pressure side surface 66 and a suction side surface 68.

The tip 60 has a primary radially-outward facing surface 70. The surface 70 may at least partially surrounds a tip squealer pocket (not shown) extending radially inward from the tip surface 70. In some embodiments, an abrasive coating may be applied along the surface 70 and the TBC system may be applied along the pressure and suction side surfaces of the airfoil, the fillet, and the gaspath-facing surface of the platform.

The root has a front (fore) face 56, an aft face 57, a first side 58, and a second side 59.

FIG. 2 shows the cooling passageway system 100 as including multiple trunks 102A, 102B, 102C extending from respective inlets 104A, 104B, 104C along the inner diameter face 50 of the root. Depending upon blade configuration, the trunks may branch in multiple spanwise cavities optionally with turns such that a cavity with tipward flow is termed an up pass and a cavity leg with rootward flow is termed a down pass. Additionally, there may be one or more impingement cavities such as a leading edge impingement cavity (not shown) fed by impingement holes from one of the up pass or down pass cavities and discharging via associated outlets to the airfoil exterior surface. Various of the cavity legs may discharge to the tip/tip pocket. Additionally, there may be a tip flag leg 130 passing in a rearward to the trailing edge from one of the more forward trunks. The exemplary trailing edge slot 140 is fed by the most rearward trunk.

The blade further comprises a first coating 24 (FIG. 3) along the blade airfoil pressure and suction sides and platform gaspath surface as noted above. As is discussed further below, the example first coating 24 is a thermal barrier coating (TBC) system and/or environmental barrier coating (EBC) system including a first modified MCrAlY bondcoat and one or more ceramic layers.

Figure 4:
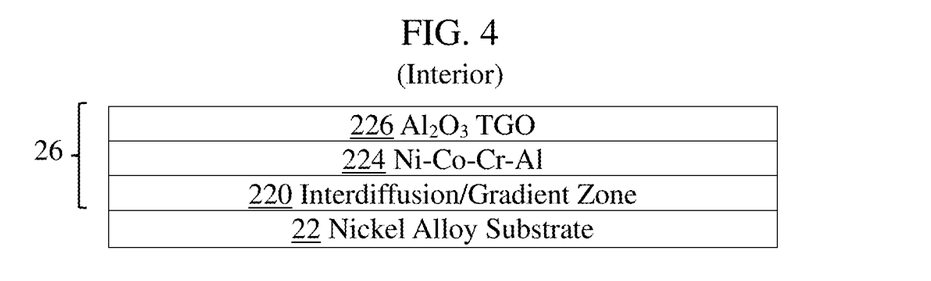
FIG. 4 is a schematic cross-sectional view of the blade taken along line 4-4 of FIG. 2 and showing a cooling passageway coating.

The blade further comprises a second coating 26 (FIG. 4). The second coating 26 is substantially an aluminide environmental resistant coating principally on an interior of the blade.

Figure 5:
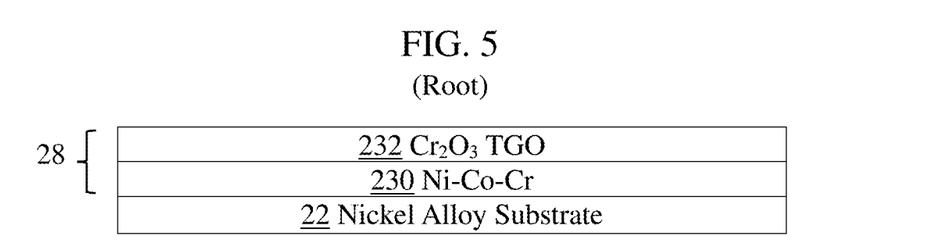
FIG. 5 is a schematic cross-sectional view of the blade taken along line 5-5 of FIG. 2 and showing an attachment root coating.

The blade further comprises a third coating 28 (FIG. 5). The third coating 28 is substantially a chromization coating principally on an exterior of the blade root.

Figure 6:
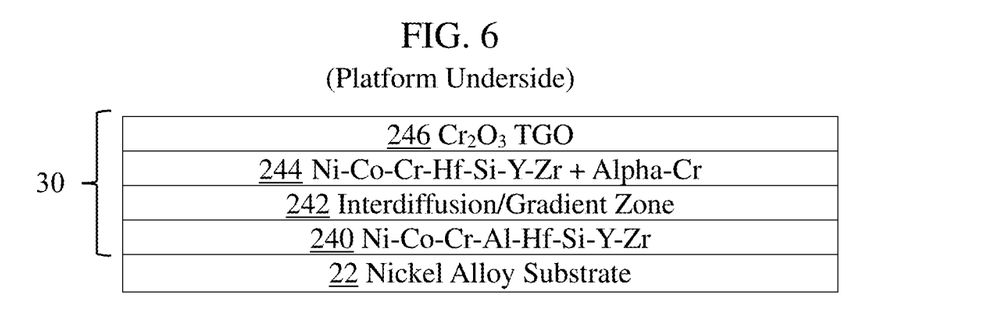
FIG. 6 is a schematic cross-sectional view of the blade taken along line 6-6 of FIG. 2 and showing an under-platform coating.

The blade further comprises a fourth coating 30 (FIG. 6). The fourth coating 30 is substantially a second modified MCrAlY (a different modification of the same base MCrAlY modified for the bondocat) coating principally on the underside of the platform.

Figure 7:
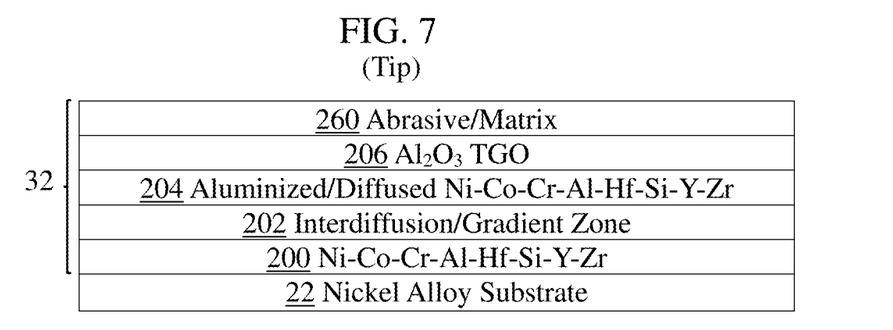
FIG. 7 is a schematic cross-sectional view of the blade taken along line 7-7 of FIG. 2 and showing a tip coating.

The blade further comprises a fifth coating 32 (FIG. 7). The example fifth coating 32 is substantially an abrasive coating atop a modified MCrAlY system principally on the tip. An alternative coating 32 is substantially an aluminide environmental resistant coating The first coating 24 (FIG. 3—gaspath surfaces) along the blade airfoil pressure and suction sides and platform gaspath surface comprises (e.g., majorities of all three), from undisturbed material of the substrate 22 outward: an MCrAlY 200 (applied by plasma spray or PVD and relatively undisturbed from the as-applied condition); a diffusion/gradient zone 202 (discussed further below); an aluminzation layer 204 (aluminzation to Al-enrich the original MCrAlY); an $Al_2O_3$ thermally grown oxide (TGO) 206; and a ceramic barrier layer 208 (e.g., 7YSZ and/or $Gd_2Zr_2O_7$ applied by EB-PVD). The MCrAlY 200 has a relatively high chromium content such as Ni-7% Al-20% Co-33% Cr-0.6% Si-0.1% Hf-0.4% Y-0.05% Zr. The example MCrAlY 200 is a NiCo- CrAlY such as a Ni—Co—Cr—Al—Hf—Si—Y—Zr. The Hf is relevant to improved scale growth and scale spallation. The Si is relevant to improved scale growth and scale spallation. The Zr is relevant to improved scale growth and scale spallation. Although Co is optional, some Co is advantageous to hinder interdiffusion with a Co-containing substrate. In such cases, example Co may be at least 5.0% by weight (e.g., with optional alternative upper limits of 30.0%, 25.0% and 20.0%).

Figure 3:
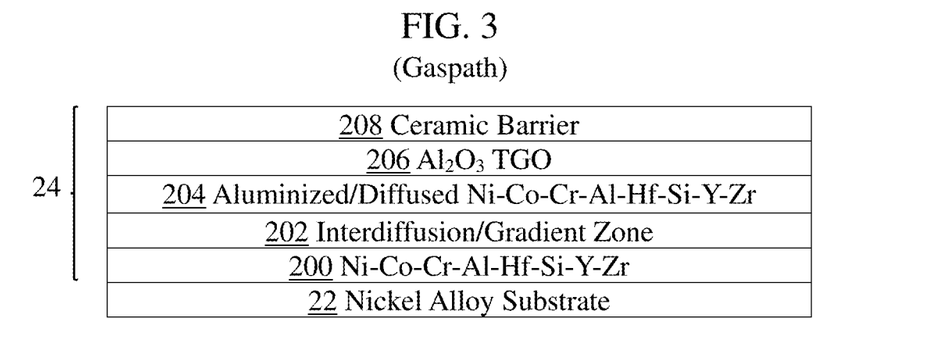
FIG. 3 is a schematic cross-sectional view of the blade taken along line 3-3 of FIG. 2 and showing a gaspath-facing coating.

The MCrAlY 200 has an example thickness of half a mil to 10 mils (12 micrometer to 254 micrometer), more particularly 12.0 micrometers to 25 micrometers and about 10% to 90% of the combined thickness of 200/202/204, more particularly about 30% to 70% or 40% to 60%. As discussed below layer 200 is a vestige of an originally applied layer of an example thickness of 12.0 micrometers to 250 micrometers, more particularly 25 micrometers to 50 micrometers.

The aluminization layer 204 is an Al-enriched/Cr-depleted portion of the as-applied MCrAlY as modified by an aluminzation that typically adds a net 25 micrometers (more broadly 10.0 micrometers to 40 micrometers) to the as-applied MCrAlY thickness. Example thickness of layer 204 is 12.0 micrometers to 75 micrometers, more particularly 12.0 micrometers to 25.0 micrometers, of thickness and about 10% to 90% of the combined thickness of 200/202/204, more particularly about 30% to 70% or 40% to 60%. The layer 204 thickness may represent an example 100% to 200% of the added thickness (thickness added by the aluminization).

The gradient zone 202 is about 0 micrometers to 30 micrometers of thickness, more particularly 10 micrometers to 30 micrometers or 12 micrometers to 20 micrometers and about 0% to 40% of the combined thickness of 200/202/204, more particularly about 0% to 30% or 5% to 20%. Thus, with smaller gradient zones, the compositional variation may be close to stepwise as a single step.

An example aluminum enrichment of the layer 204 relative to the layer 200 is a difference of at least 5.0% by weight, more particularly 5.0% to 25.0% or 6.0% to 18.0%. The interdiffusion/gradient zone 202 may represent a transition in elemental content.

An example chromium depletion of the layer 204 relative to the layer 200 is a difference of an example at least 5.0% by weight, more particularly 5.0% to 25.0% or 7.0% to 15.0%.

Example TGO 206 thickness is 1.0 micrometer, more particularly 0.2 micrometer to 0.8 micrometer or 0.3 micrometer to 0.7 micrometers or, more broadly 0.2 micrometer to 2.0 micrometers.

Example barrier 208 thickness is 100 micrometers to 500 micrometers.

The second coating 26 (FIG. 4—interior/passageways) comprises, from undisturbed material of the substrate 22 outward: an aluminide diffusion layer 220; an aluminide additive layer 224; and an $Al_2O_3$ thermally grown oxide (TGO) 226. Specifically, an aluminide additive layer 224 contains Al content of about 10% to 40% by weight, more particularly 25% to 30% or 20% to 30%.

Example layer 224 thickness is 5.0 to 75.0 micrometers, more particularly 15.0 to 35 micrometers. Example layer 220 thickness is 12.0 micrometers, more broadly, 5.0 to 35.0 micrometers. Example alumina TGO layer 226 thickness is 1 micrometer more particularly 0.2 micrometer to 0.8 micrometer or 0.3 micrometer to 0.7 micrometers or, more broadly 0.2 micrometer to 2.0 micrometers.

The third coating 28 (FIG. 5—root) comprises, from undisturbed material of the substrate 22 outward: a chromization layer (NiCoCr diffusion layer) 230; and a $Cr_2O_3$ thermally grown oxide (TGO) 232. Specifically, a chromide additive layer containing Cr content of about 10 to 50% weight percent, more particularly 15% to 50% or 15% to 30% with the remainder principally being Ni and Co with substantially reduced Al, if any. Example chromizing adds from about 1.0 micrometer to 25 micrometers. May be less than the aluminum adds because the chromization depletes aluminum (discussed below).

Example layer 230 thickness is about 5.0 micrometers to 25.0 micrometers, more particularly 10.0 micrometers to 20.0 micrometers or 12.0 micrometers to 18.0 micrometers.

Example TGO layer 232 thickness is about 1 micrometer, more particularly 0.2 micrometer to 0.8 micrometer or 0.3 micrometer to 0.7 micrometers or, more broadly 0.2 micrometer to 2.0 micrometers.

The fourth coating 30 (FIG. 6—platform underside) comprises, from undisturbed material of the substrate 22 outward: an MCrAlY 240 (applied by plasma spray or PVD); a diffusion layer 242, and an NiCoCrAlY plus alpha-Cr layer 244; and a $Cr_2O_3$ thermally grown oxide (TGO) 246. Discussed further below, the MCrAlY 200 and MCrAlY 240 may come from the same source and application step 830 below so that the layers 204 and 244 result from respective over-aluminization and over-chromization of the as-applied MCrAlY (with 200 and 240 representing surviving original MCrAlY that, however, may have slightly altered conditions/compositions. Specifically, the layer 244 is formed by a slurry chromizing process simultaneous with the aluminzation elsewhere. The chromizing process removes aluminum from the surface and replaces it with chrome allowing the $Cr_2O_3$ thermally grown oxide to subsequently grow. Specifically, the MCrAlY 240 that is underneath is already very high chromium content and the chromizing adds enough Cr to precipitate alpha-Cr from a gamma NiCoCrAlY (which typically includes gamma and beta phases but not alpha) into separate phase that is exclusively Cr (alpha Cr). The aluminum depletion will typically not be total so that the altered NiCoCrAlY in the layer 244 will still be a NiCoCrAlY.

The overall chemistry of the layer 244 is at least 70% Cr by weight (more narrowly, at least 75% or an example 75% to 90%). Example percent of the alpha Cr is 85% Cr. Aluminum is drawn outward into the mask. This is in distinction to the root coating 28 where there is less Cr in the substrate than in the MCrAlY elsewhere. Thus, there will be little to no Cr precipitation. An example difference in MCrAlY 200/240 Cr content over substrate Cr content is 15% to 50% by weight, more particularly 20% to 40%. For example, substrate Cr content may be about 5%.

Example layer 240 thickness is about 120 micrometers, more particularly 75 micrometers to 180 micrometers or 100 micrometers to 150 micrometers.

Example layer 242 thickness is about 10 micrometers, more particularly 5.0 micrometers to 20.0 micrometers or 8.0 micrometers to 15.0 micrometers.

Example layer 244 thickness is about 5 micrometers, more particularly 1.0 micrometers to 15.0 micrometers or 3.0 micrometers to 10.0 micrometers.

Example layer 246 thickness is about 1 micrometer, more particularly 0.2 micrometers to 0.8 micrometers or 0.3 micrometers to 0.7 micrometers or, more broadly 0.2 micrometer to 2.0 micrometers.

One example of the fifth coating 32 (tip) is the gaspath coating 24 absent ceramic barrier 208. The illustrated FIG. 7 variation is the gaspath coating 24 with an abrasive/matrix layer 260 instead of the ceramic barrier 208. Example abrasive is cBN and example matrix is an MCrAlY. One group of application processes for the abrasive/matrix layer 260 is plasma spray. Alternatives include plating. One example of plating involves a nickel plating (e.g., Ni—Co electroplating) tack of cBN atop the TGO 206 followed by plating (e.g., Ni—Co electroplating) of the MCrAlY matrix. The MCrAlY matrix may differ from the MCrAlY below it (applied at 830) by elemental composition differences, principally a much lower Cr content (e.g., at least 50% less as applied and/or as source/feedstock). Another example of the fifth coating 32 is essentially the same aluminide as the second coating 26.

Figure 8:
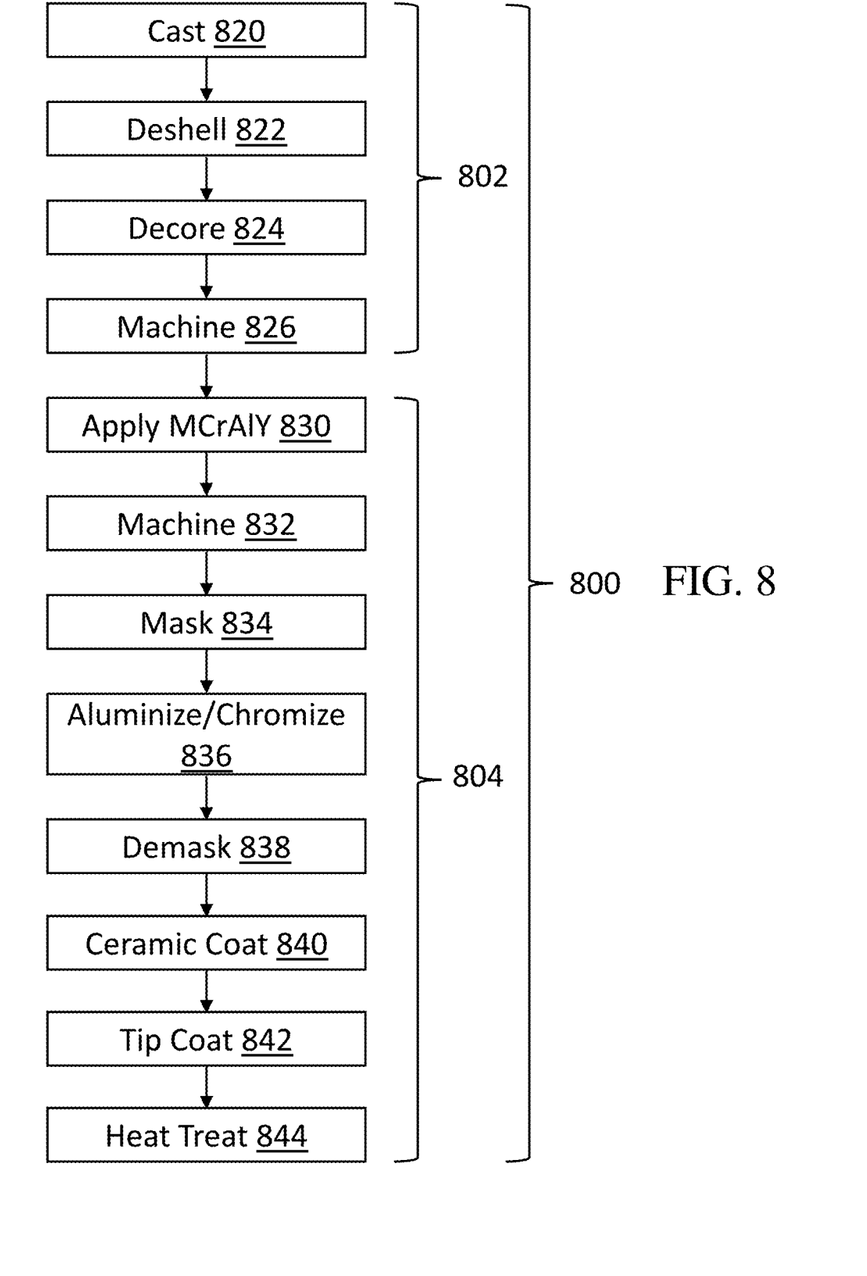
FIG. 8 is a process flowchart.

Discussed below, a manufacture process 800 may have a single MCrAlY application step 830 and a subsequent simultaneous aluminization and chromization step 836. The simultaneous aluminization and chromization step 836 involves applying 834 a Cr-containing mask to one or more regions. In the single step, at least some regions under the mask are chromized and at least some unmasked regions are aluminized. This allows multiple combinations of base MCrAlY, chromization (of substrate or MCrAlY), and aluminization (of substrate or MCrAlY).

The simultaneous aluminization and chromization step may: aluminize uncoated regions (bare substrate); overaluminize MCrAlY-coated regions to alter their structure; over-chromize other uncoated regions; and over-chromize other MCrAlY-coated regions to alter their structure. Ceramic coating 840 may add one or more coating steps. Thus, prior to ceramic coating, a diverse combination of coating layerings may be applied via just two basic coating application steps 830 and 836.

In an example manufacturing process 800, in a casting process 802, the substrate precursor is cast 820 (e.g., investment cast with a sacrificial ceramic feedcore or optionally a ceramic feedcore with refractory metal core (RMC) components assembled therewith such as to cast a discharge slot or the like). The as-cast casting may be deshelled 822 (e.g., mechanical breaking) and decored 824 (e.g., alkaline and/or acid leaching and/or a thermo-oxidative decoring).

One or more machining steps 826 (e.g., cutting, milling, abrasive machining, and the like) may de-gate and yield a final substrate surface (e.g., at least along significant portions of the airfoil lateral surface, and the platform OD and ID surfaces).

Such machining (if any) may yield near net or other surfaces along the root and tip (which will be subject to subsequent machining). Allowance for subsequent machining on these or other areas of the blade or analogous areas of an alternative component allows for coatings to temporarily be applied (when such coatings ultimately remain on other areas) but then be machined away. As is seen below, this may help yield an efficient process for providing the desired diverse combination of coatings across different regions of the ultimate article.

A two coating step coating process 804 uses an MCrAlY deposition 830 (e.g., cathodic arc) and gas phase aluminizing 836 (which also provides pack chromizing) to produce a component with varied coating layerings giving adequate protection while minimizing manufacturing steps.

First, an MCrAlY such as a high-Cr MCrAlY of the type normally used for localized under-platform (U/P) protection (e.g., the '830 patent), is applied 830 to substantially the entire exterior of the casting from the root (precursor) lobes/serrations (e.g., pre-grinding) upwards to the tip (optionally overspraying the tip depending on the tip coating variation). The key areas for coating in this step are: the platform (outer diameter (OD) gaspath surface and inner diameter (ID) under-platform (U/P) surface and edges); and the airfoil lateral surface (pressure side and suction side). In this example, the root and in some implementations, tip are less relevant and are left unmasked and subject to overspray or the like.

This one step process may cover all areas in 10 micrometers to 250 micrometers, more narrowly 12.0 micrometers to 100 micrometers, more narrowly 25 micrometers to 50 micrometers of MCrAlY coating. An example application process is plasma spray or cathodic arc or PVD (e.g., EB-PVD). The cathodic arc or PVD may be in a vacuum chamber. The substrate may be held (fixtured) by the preground root during this coating. This first MCrAlY forms a precursor for the layers 200 and 240 and diffusion and reaction zones above.

Then the root grinding/machining, tip grinding/machining (optionally), and cooling hole machining/drilling (optionally) is performed 832. For example, doing this after MCrAlY application helps prevent coat down of the cooling holes. In this example, the machining of root (and optionally tip) removes the MCrAlY coating from any portions of those areas that got coated and any affected a sublayer of the substrate. Thus masking was not required during MCrAlY application.

Figure 9:
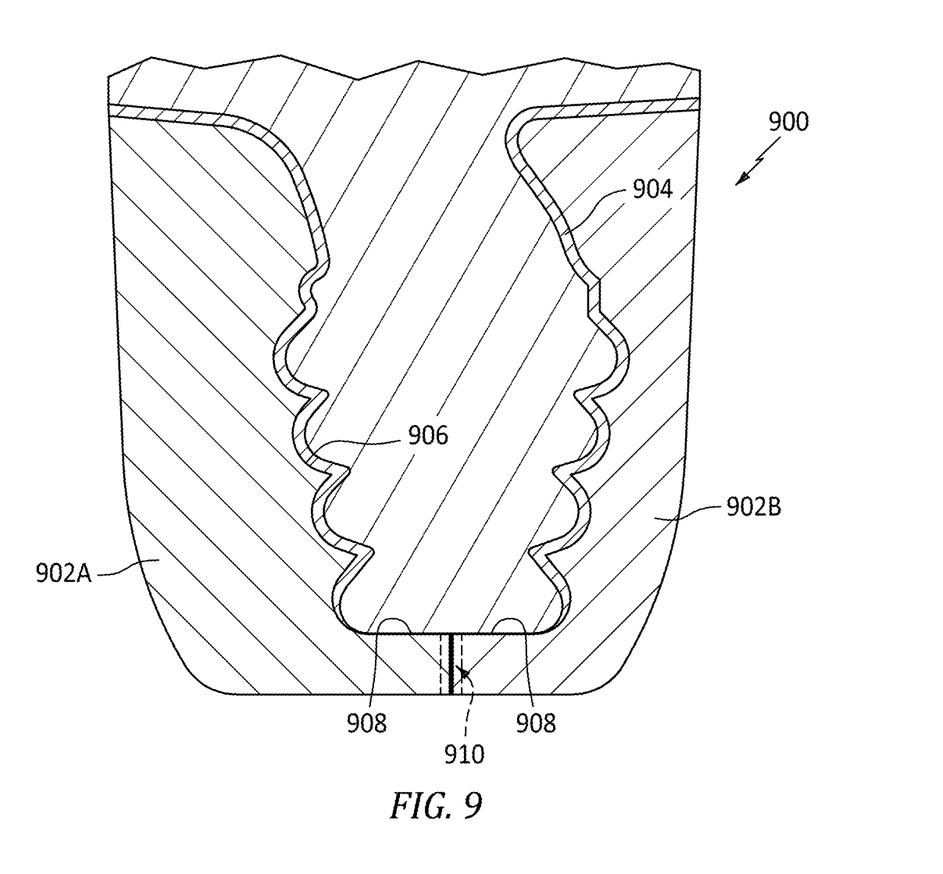
FIG. 9 is a sectional view of a mask.

Subsequently, in an example masking step 834 a Cr-slurry-based maskant (e.g., a lining 904 of a two-piece sintered mask structure 900 assembled over the root) is applied only to the root and under platform areas. Example slurry is a chromium halide slurry, particularly $CrCl_3$ and/or $CrF_3$ slurry (e.g., with Cr powder and an organic solvent/carrier/binder such as glycol ether). Example slurry has 50 to 70 weight percent chromium powder about 2.0 to 6.0 weight percent $CrCl_3$ and/or $CrF_3$. and remainder substantially solvent/carrier/binder. A particular example is about 57 weight percent Cr powder, 3 weight percent $CrCl_3$ and about 40 weigh percent binder (e.g. an n-propyl bromide-based organic binder such as available from APV Engineered Coatings, Inc. of Akron Ohio as B-4 binder). Example slurry application is by dipping and drying of the sintered material at a slightly elevated temperature (e.g., about ~200° F. (93° C.) or 80° to 120° C., although lower temperature and longer times could be utilized), performing a diffusion heat treatment, and cleaning of remnant slurry material using a light grit blast (e.g., about 20 psi (140 kPa) pressure blast, 240 grit $Al_2O_3$, 15 to 25 centimeter stand-off distance).

The sintered material may generally be of the '762 patent material. The sintered pieces may be formed of gamma prime NiAlCr powder (as an active aluminum getterer) and alumina powder (as an inert filler), along with an organic binder/lubricant (e.g., hydroxypropyl cellulose that is volatilized or burned off during sintering). Ultimately, during the aluminzation of the blade, this will chromize the root serrations and under-platform pocket areas while acting as a maskant (getter) for the aluminide.

FIG. 9 is a sectional view of the mask 900. It shows the two sintered mask pieces 902A,902B having the chromizing coating 904 along pocket portions 906 of their surfaces that surround the blade root (front, rear, and side lobes (serrations etc.) and contact the platform underside. An outer case (not shown—e.g., nickel or nickel alloy) (e.g., cast or additively manufactured) may contain the two sintered mask pieces. In this example, the chromizing coating 904 is not along portions 908 of the sintered pieces' pocket surfaces contacting the inner diameter (ID) face (base) of the root so that the root ID face is essentially non-chromized and non-aluminized and is left as essentially unaffected/uncoated substrate material. In this example, the exposed sintered mask material along the root ID face is effective to getter aluminum from the aluminization process without substantially impacting aluminum content of the exposed substrate. FIG. 9 shows ports 910 in this section open to the trunk inlets in the root ID surface to introduce the aluminization vapors to the passageways.

The gettering function is principally provided by the NiAlCr powder within the sintered mask. Where the chromizing coating 904 is present, the Al effectively is transported through the coating 904 into the sintered material.

In an example, the mask may be assembled from two pieces that each have sections for engaging one respective circumferential side (side of the firtree cross-section) of the root, the adjacent under platform areas (platform underside), and the adjacent portions of the fore-and-aft ends of the root and inner diameter (ID) surface of the root. A parting plane between these two pieces may be centrally through the root. The pieces may be secured by a metallic or ceramic holder (not shown) around the mask. The pieces may be molded and sintered such as via a mixture of alumina ($Al_2O_3$) and powder(s) containing Ni, Al, and Cr in one or more phases (e.g., a NiAlCr intermetallic powder). An alternative may include such alumina mixed with gamma phase NiCr and beta phase NiAl. Other variations may include one or both of said NiCr and NiAl mixed with NiAlCr. There may be optional further dilution with Ni powder in all those situations. One example of such material for sintering is available from APV Engineered Coatings, Inc. of Akron Ohio as M-1.

Example $Al_2O_3$ weight content of sintered mask material (before slurry application or away from any slurry-affected region) is about 62%, more broadly at least 30%, more particularly with alternative lower limits of 45% or 50% and alternative upper limits of 65% or 70% or 75% in any combination.

Example Ni weight content of sintered mask material is about 28%, more broadly at least 10%, more particularly with alternative lower limits of 15% or 20% and alternative upper limits of 35% or 40% or 45% in any combination.

Example non-alumina Al weight content of sintered mask material is about 7%, more broadly at least 3.0%, more particularly with alternative lower limits of 4.0% or 5.0% and alternative upper limits of 8.0% or 10.0% or 12.0% in any combination.

Example Cr weight content of sintered mask material is about 3%, more broadly at least 1.0%, more particularly with alternative lower limits of 1.5% or 2.0% and alternative upper limits of 3.5% or 4.0% or 5.0% in any combination.

This whole assembly is then put through a vapor or CVD aluminizing process 836 to: 1) coat the internals of the airfoil with aluminide; 2) over-aluminize the high-Cr MCrAlY on the gaspath surfaces (platform gaspath surface and airfoil lateral surfaces and optionally tip in the associated illustrated implementation); 3) aluminize the bare tip (in the associated non-illustrated embodiment); 4) chromize the root serrations (the Cr slurry chromizes the substrate while masking the substrate from the aluminum); and 5) over-chromize the high-Cr MCrAlY underneath the platform pockets (the Cr slurry further chromizes the already high-Cr MCrAlY while masking the high-Cr MCrAlY-coated substrate from the aluminum).

For example, the aluminizing may include placing the casting/mask assembly an aluminizing retort containing the activator (e.g., an aluminum halide such as $AlF_3$ and/or $AlCl_3$ activator in powder form) and Al (as an Al source) and Cr (as an activity moderator) metallic source (e.g., powder and/or compressed block, cast/crushed pieces, pellets or the like) exposed to a protective atmosphere (e.g., Ar and/or $H_2$) and heated.

Aluminization is caused by halide deposition of Al from the halide and Al metal source to the alloy surface due to differing aluminum activities between the halide gas and the surface.

Thereafter, the mask is removed 838. This may include physical removal or grit blasting. Then there may be a ceramic coating 840, heat treatment 844 and tip abrasive application 842. FIG. 8 shows the heat treatment after abrasive tip coating. The heat treatment is effective to cause the various TGO to grow. An example heat treatment involves 2-50 hours at 1090° C. (more broadly 600° C. to 1200° C.) in a protective atmosphere (argon and/or hydrogen).

The initial high-Cr MCrAlY composition may be an example Ni-7% Al-20% Co-33% Cr-0.6% Si-0.1% Hf-0.4% Y-0.05% Zr.

The over-aluminizing of the high-Cr MCrAlY on the gaspath surfaces (FIG. 3) may cause the MCrAlY to stratify. Aluminum will replace chromium, driving the chromium toward the substrate. This effectively creates three regions: a lower region 200 close to the original MCrAlY composition, an intermediate region 202 with elevated Cr and an outer region 204 with depleted Cr and elevated Al. A final MCrAlY composition in the subject regions may be a rough example Ni-20% Al-15% Co-10% Cr-0.3% Si-0.05% Hf-0.4% Y-0.05% Zr in 204, Ni-15% Al-15% Co-30% Cr-0.3% Si-0.05% Hf-0.4% Y-0.05% Zr in 202 and Ni-7% Al-20% Co-33% Cr-0.6% Si-0.1% Hf-0.4% Y-0.05% Zr in 200.

The over-chromizing of the high-Cr MCrAlY underneath the platform pockets (FIG. 6) may cause the initial MCrAlY composition to also stratify. But instead of driving Al downward (toward the substrate), the Al is driven outward into the aluminum-gettering mask. A final MCrAlY composition in the subject regions may be Ni-7% Al-20% Co-33% Cr-0.6% Si-0.1% Hf-0.4% Y-0.05% Zr in layer 240; Ni-3% Al-15% Co-50% Cr-0.6% Si-0.1% Hf-0.4% Y-0.05% Zr in layer 242; and Ni-1% Al-10% Co-70% Cr-0.6% Si-0.1% Hf-0.4% Y-0.05% Zr in layer 244 (inclusive of both the NiCoCrAlY and alpha-Cr)

This two-step process would create an airfoil coating (aluminized high-Cr MCrAlY) that gives excellent TBC spallation characteristics. Typical high-Cr MCrAlY systems incur an oxidation and spallation debit (where used as a bondcoat below a ceramic barrier coat) due to the high-Cr nature of the coating. The over-aluminizing of a high-Cr MCrAlY can bring oxidation and spallation performance comparable to industry best high-Al MCrAlY coatings.

The over-chromized high-Cr MCrAlY layer 244 along the platform underside encases the inner portion 240 of the MCrAlY in a layer 244 that's mostly alpha-Cr making it an estimated 2×+ better in hot corrosion for under platform protection.

The various layer and feedstock materials may consist essentially of the identified associated elements such as with impurity levels of other elements or may have intentional additions. Example minor amounts of intentional additions total not more than 5.0% or less than 2.0% and individually are not more than 4.0%, 2.0%, or 1.0%.

The use of "first", "second", and the like in the following claims is for differentiation within the claim only and does not necessarily indicate relative or absolute importance or temporal order. Similarly, the identification in a claim of one element as "first" (or the like) does not preclude such "first"

element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A method for coating a metallic substrate, the method comprising:
   applying a first MCrAlY coating;
   machining to remove said first MCrAlY coating from one or more regions of the substrate;
   applying a mask having at least a chromium-containing chromizing portion to a combination of:
      regions of the substrate from which the first MCrAlY has been removed; and
      regions of the substrate on which the first MCrAlY remains but not on other regions of the substrate on which the first MCrAlY remains;
   aluminizing:
      an interior surface region of the substrate; and
      at least a portion of the region where the first MCrAlY remains absent the mask, wherein, during the aluminizing, the mask masks from the aluminizing but chromizes the regions to which the chromizing portion was applied; and
   removing the mask.

2. The method of claim 1 wherein:
   the mask is pre-formed and is applied as at least two pieces.

3. The method of claim 1 wherein the mask comprises:
   a sintered substrate; and
   a chromium halide coating forming the chromizing portion on the sintered substrate.

4. The method of claim 3 wherein:
   the sintered substrate comprises alumina, Ni, Cr, and additional Al.

5. The method of claim 4 wherein:
   the sintered substrate comprises NiAl, NiCr and alumina; and/or
   the sintered substrate comprises NiAlCr and alumina.

6. The method of claim 1 wherein:
   the aluminizing comprises exposing to an aluminum halide activator.

7. The method of claim 1 wherein:
   the first MCrAlY comprises 25% to 40% by weight Cr.

8. The method of claim 1 wherein:
   the first MCrAlY comprises 5% to 15% by weight Al.

9. The method of claim 1 wherein the first MCrAlY comprises by weight:
   25% to 40% Cr;
   5% to 15% by weight Al;
   0.01% to 2.0% Y;
   up to 30% Co;
   0.01% to 5.0% Si;
   0.01% to 2.0% Hf;
   0.01% to 0.10% Zr; and
   balance Ni plus impurities.

10. The method of claim 1 wherein the substrate is a blade precursor substrate having:
    a root section;
    an airfoil section; and
    a platform section between the root section and the airfoil section, wherein the mask is applied to the root.

11. The method of claim 10 wherein:
    the regions of the substrate from which the first MCrAlY has been removed by the machining but to which the chromizing portion was applied comprise surfaces of the root section;
    the regions of the substrate on which the first MCrAlY has not been removed by the machining but to which the chromizing portion was applied comprise an underside of the platform section; and
    the other regions of the substrate on which the first MCrAlY has not been removed by the machining comprise a majority of a lateral surface of the airfoil section and an outer diameter surface of the platform section.

12. The method of claim 11 wherein one of:
    a tip of the airfoil is a region of the substrate from which the first MCrAlY has been removed by the machining but to which the mask was not applied; and
    said other regions of the substrate on which the first MCrAlY has not been removed by the machining but to which the chromizing portion was not applied comprise a tip of the airfoil section.

13. The method of claim 11 wherein:
    a region of the substrate from which the first MCrAlY has been removed but to which a portion of the mask other than the chromizing portion was applied comprises an inner diameter face of the root.

14. The method of claim 1 further comprising:
    applying a ceramic coating along at least some of said other regions of the substrate on which the first MCrAlY remains.

15. A blade having a metallic substrate with internal passageways and having:
    an attachment root having one or more inlets to the passageways;
    an airfoil through which the passageways pass;
    a platform between the root and the airfoil and having an underside surface adjacent the root and a gaspath surface adjacent the airfoil;
    a first coating along a majority of the airfoil comprising:
       one or more NiCoCrAlY layers progressively outwardly increasing in aluminum content; and
       one or more ceramic layers;
    a second coating along the internal passageways comprising:
       an aluminization;
    a third coating along the root comprising:
       a NiCoCr chromization; and
    a fourth coating (30) along the underside of the platform comprising:
       a NiCoCrAlY layer; and
       a NiCoCrAlY plus alpha-Cr layer.

16. The blade of claim 15 wherein the blade further comprises:
    a fifth coating on a tip of the airfoil comprising:
       a NiCoCrAlY layer; and
       an abrasive layer.

17. The blade of claim 15 wherein:
    the first coating further comprises an alumina TGO;
    the second coating further comprises an alumina TGO;
    the third coating further comprises a chromia TGO; and
    the fourth coating further comprises a chromia TGO.

18. The blade of claim 15 wherein:
the first coating progressive aluminum increase is at least a difference of 5.0% by weight;
the fourth coating NiCoCrAlY plus alpha-Cr layer has at least 70% Cr by weight;
the blade has a Ni-alloy substrate; and;
the root is a firtree root.

19. A method for coating a metallic substrate, the method comprising:
applying a first MCrAlY coating;
machining the substrate after application of the first MCrAlY coating to remove said first MCrAlY coating from one or more regions of the substrate; and
a step for simultaneously:
aluminizing:
an interior surface region of the substrate lacking the first MCrAlY; and
at least a portion of a region where the first MCrAlY remains; and
chromizing:
an exterior surface region of the substrate lacking the first MCrAlY; and
at least a different portion of the region where the first MCrAlY remains.

20. The method of claim 19 wherein:
said exterior surface region of the substrate lacking the first MCrAlY includes at least a portion of the one or more regions of the substrate from which the first MCrAlY was removed.

\* \* \* \* \*